United States Patent
Ogasawara

(10) Patent No.: US 9,361,113 B2
(45) Date of Patent: Jun. 7, 2016

(54) SIMULTANEOUS FINISH OF STORES AND DEPENDENT LOADS

(71) Applicant: GLOBALFOUNDRIES U.S. 2 LLC, Hopewell Junction, NY (US)

(72) Inventor: Takeshi Ogasawara, Tokyo (JP)

(73) Assignee: GLOBALFOUNDRIES INC., Grand Cayman (KY)

( * ) Notice: Subject to any disclaimer, the term of this patent is extended or adjusted under 35 U.S.C. 154(b) by 528 days.

(21) Appl. No.: 13/869,131

(22) Filed: Apr. 24, 2013

(65) Prior Publication Data

US 2014/0325188 A1 Oct. 30, 2014

(51) Int. Cl.
- *G06F 9/30* (2006.01)
- *G06F 9/00* (2006.01)
- *G06F 9/38* (2006.01)

(52) U.S. Cl.
CPC .............. *G06F 9/3857* (2013.01); *G06F 9/384* (2013.01); *G06F 9/3834* (2013.01)

(58) Field of Classification Search
CPC .. G06F 9/3838; G06F 9/30043; G06F 9/3867
See application file for complete search history.

(56) References Cited

U.S. PATENT DOCUMENTS

| | | | |
|---|---|---|---|
| 6,021,485 A | 2/2000 | Feiste et al. | |
| 6,349,382 B1 | 2/2002 | Feiste et al. | |
| 7,590,825 B2 | 9/2009 | Krimer et al. | |
| 2007/0288725 A1 | 12/2007 | Luick | |
| 2013/0339679 A1* | 12/2013 | Iyer | G06F 9/3851 712/225 |
| 2014/0258697 A1* | 9/2014 | Sudhakar | G06F 9/30079 712/245 |
| 2014/0281384 A1* | 9/2014 | Zeng | G06F 9/30043 712/42 |
| 2014/0331236 A1* | 11/2014 | Mitra | G06F 15/7867 718/105 |

* cited by examiner

*Primary Examiner* — Hyun Nam
(74) *Attorney, Agent, or Firm* — Hoffman Warnick LLC; Michael LeStrange

(57) ABSTRACT

A method for reducing a pipeline stall in a multi-pipelined processor includes finding a store instruction having a same target address as a load instruction and having a store value of the store instruction not yet written according to the store instruction, when the store instruction is being concurrently processed in a different pipeline than the load instruction and the store instruction occurs before the load instruction in a program order. The method also includes associating a target rename register of the load instruction as well as the load instruction with the store instruction, responsive to the finding step. The method further includes writing the store value of the store instruction to the target rename register of the load instruction and finishing the load instruction without reissuing the load instruction, responsive to writing the store value of the store instruction according to the store instruction to finish the store instruction.

18 Claims, 5 Drawing Sheets

SIMULTANEOUS FINISH OF STORES AND DEPENDENT LOADS

BACKGROUND

1. Technical Field

The present invention relates generally to computer processing and, in particular, to the simultaneous finish of stores and dependent loads.

2. Description of the Related Art

A common problem found in high performance microprocessor designs is detecting and handling load address dependencies, and in particular, load and store memory address conflicts. Generally, a load and store memory address conflict occurs when a load instruction follows a store instruction directed to the same memory address, and the store instruction has not yet been committed to memory or otherwise cleared.

In an out-of-order (OOO) execution, a processor issues a load instruction before issuing a store instruction that appears earlier than the load instruction in program order. This reordering is a common optimization used in many processors to improve performance by hiding the load latencies.

However, when more than one instruction references a particular location for an operand, either reading the operand as an input or writing the operand as an output, executing such instructions in an order different from the original program order can lead to various data problems. For example, one such data problem is known as a "read-after-write" (RAW). A read after write (RAW) data problem refers to the situation where an instruction refers to a result that has not yet been calculated or retrieved. Thus, a read-after-write refers to the situation where a read from a register or memory location must return the value placed there by the last write in program order, and not some other write. The preceding condition implicated by a read-after-write is referred to as a true dependency, and typically requires the instructions to execute in program order to avoid the problem. In such a case, the load is considered to be dependent on the write (store), and is referred to as a dependent load.

Thus, in general, a load and store memory address conflict occurs when a load instruction follows a store instruction directed to the same memory address, and the store instruction has not yet been committed to memory or otherwise cleared. A load and store memory address conflict is typically referred to as a "load-hit-store" condition.

FIG. 1 shows the common case scenario 100 for a load instruction 121 issued before a store instruction 111 that appears earlier than the load instruction 121 in program order. The load instruction 121 is processed in a load pipeline 120, and the store instruction 111 is processed in a store pipeline 110.

Hence, consider the following behavior of the given load instruction 121 of FIG. 1: in a processor that cracks a store instruction into a data store and a store address generation, the load instruction 121 checks the availability of a value stored on a load address, is rejected and reissued (multiple times) because the stored value is not ready, and eventually reads the stored value when it is ready. That is, the load instruction 121 is initially rejected 131 (due to the stored value not being ready) at time T, and ultimately reissued 133 to read a value (the stored value) at time $T+T_a+T_{penalty}$, as described in further detail herein below, where time $T+T_a$ is the time when the store value is actually ready, that is, the store instruction has completed.

The preceding behavior causes at least two performance problems. One performance problem is that such a load suffers from extra penalties ($T_{penalty}$ in FIG. 1) because it does not read a value soon after the store is finished (at time $T+T_a$). Another performance problem is that the pipelines 110 and 120 and the instruction issue bandwidth are wasted by the repeated reissues of the load instruction 121 that are rejected.

Such load instructions are observed in the real-world programs that save data in memory and read the data in short periods. Typical examples are the byte code interpreters (e.g., RUBY), which keep updating the control variables (e.g., the stack pointer) and the stack entries in the memory.

SUMMARY

According to an aspect of the present principles, there is provided a method for reducing a pipeline stall in a multi-pipelined processor. The method includes finding a store instruction having a same target address as a load instruction and having a store value of the store instruction not yet written according to the store instruction, when the store instruction is being concurrently processed in a different pipeline than the load instruction and the store instruction occurs before the load instruction in a program order. The method also includes associating a target rename register of the load instruction as well as the load instruction itself with the store instruction, responsive to the finding step. The method further includes writing the store value of the store instruction to the target rename register of the load instruction and finishing the load instruction without reissuing the load instruction, responsive to writing the store value of the store instruction according to the store instruction to finish the store instruction.

According to another aspect of the present principles, there is provided a processor for reducing a pipeline stall caused by a store instruction and a load instruction that is dependent upon the store instruction. The processor includes one or more storage elements. The processor also includes a first pipeline for processing the load instruction. The processor further includes a second pipeline for processing the store instruction. The processor moreover includes circuitry for finding a store instruction having a same target address as a load instruction and having a store value of the store instruction not yet written according to the store instruction, when the store instruction is being concurrently processed in a different pipeline than the load instruction and the store instruction occurs before the load instruction in a program order. The processor additionally includes circuitry for associating a target rename register of the load instruction as well as the load instruction itself with the store instruction, responsive to said finding step. The processor also includes circuitry for writing the store value of the store instruction to the target rename register of the load instruction and finishing the load instruction without reissuing the load instruction, responsive to writing the store value of the store instruction according to the store instruction to finish the store instruction.

These and other features and advantages will become apparent from the following detailed description of illustrative embodiments thereof, which is to be read in connection with the accompanying drawings.

DETAILED DESCRIPTION OF PREFERRED EMBODIMENTS

Figure 1:
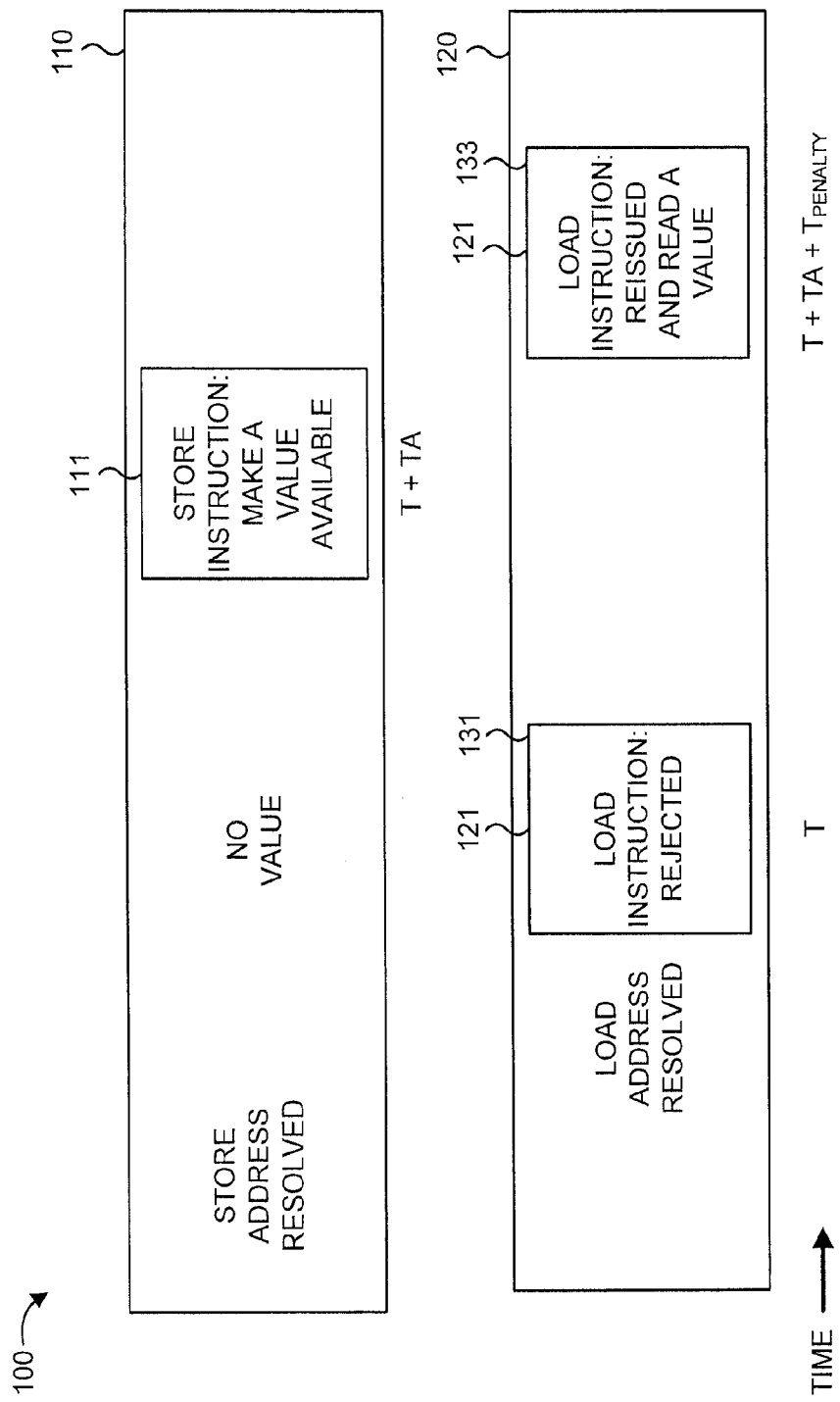
FIG. 1 is a timing diagram showing the common case scenario 100 for a load instruction 121 issued before a store instruction 111 that appears earlier than the load instruction 121 in program order.

The present invention is directed to the simultaneous finish of stores and dependent loads.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Figure 2:
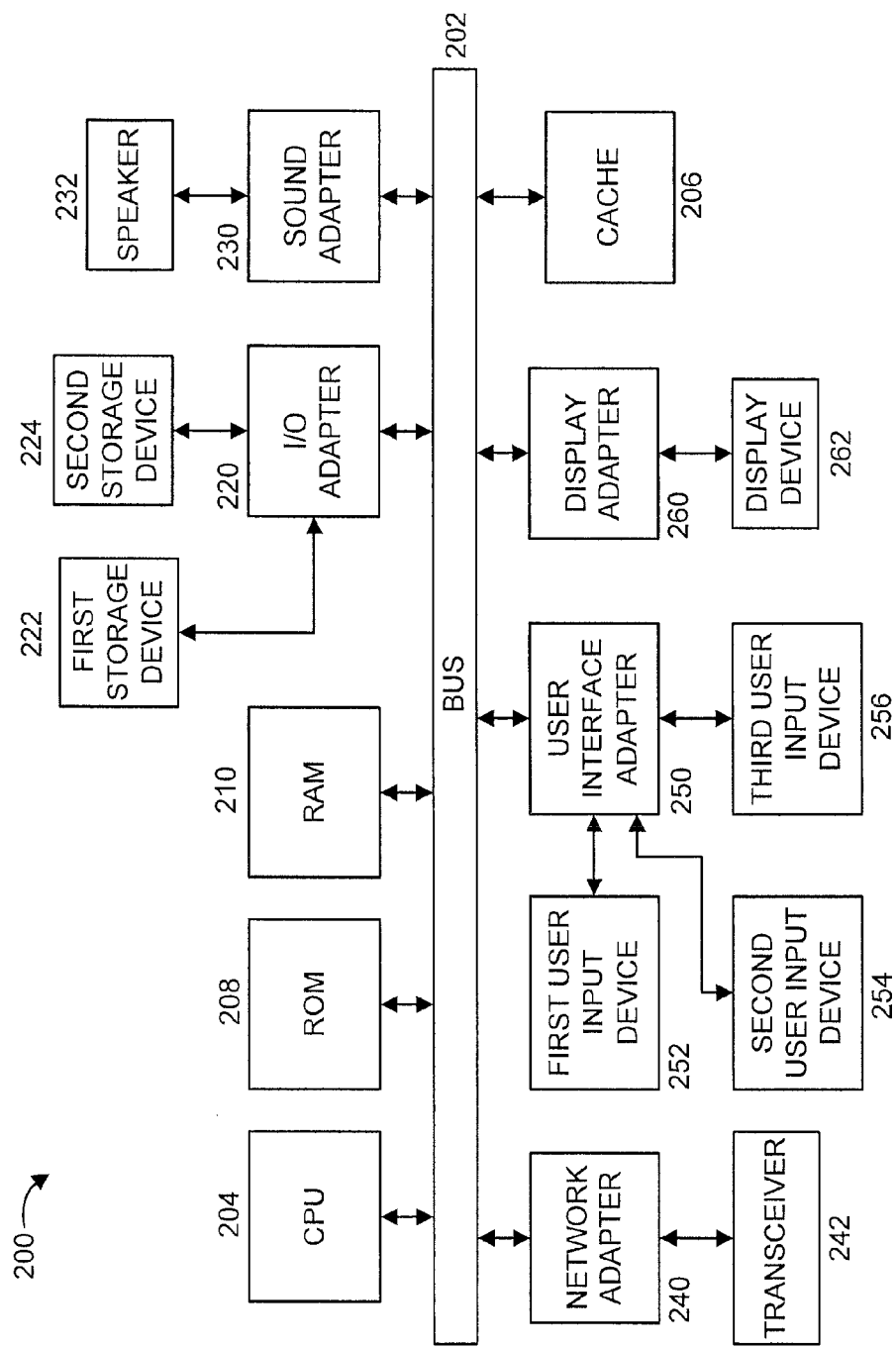
FIG. 2 is a block diagram showing an exemplary processing system 200 to which the present principles can be applied, in accordance with an embodiment of the present principles.

FIG. 2 shows an exemplary processing system 200 to which the present principles can be applied, in accordance with an embodiment of the present principles. The processing system 200 includes at least one processor (CPU) 204 operatively coupled to other components via a system bus 202. In an embodiment, the CPU 204 is a pipelined processor including multiple processing stages. In an embodiment, the CPU 204 is capable of implementing out-of-order (OOO) execution and register renaming.

A cache 206, a Read Only Memory (ROM) 208, a Random Access Memory (RAM) 210, an input/output (I/O) adapter 220, a sound adapter 230, a network adapter 240, a user interface adapter 250, and a display adapter 260, are operatively coupled to the system bus 202. While a separate cache 206 is shown with respect to CPU 204, it is to be appreciated that CPU 204 can include one or more on chip caches and so forth, as readily contemplated by one of ordinary skill in the art.

A first storage device 222 and a second storage device 224 are operatively coupled to system bus 202 by the I/O adapter 220. The storage devices 222 and 224 can be any of a disk storage device (e.g., a magnetic or optical disk storage device), a solid state magnetic device, and so forth. The storage devices 222 and 224 can be the same type of storage device or different types of storage devices.

A speaker 232 is operative coupled to system bus 202 by the sound adapter 230.

A transceiver 242 is operatively coupled to system bus 202 by network adapter 140.

A first user input device 252, a second user input device 254, and a third user input device 256 are operatively coupled to system bus 202 by user interface adapter 250. The user input devices 252, 254, and 256 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 252 and 254 can be the same type of user input device or different types of user input devices. The user input devices 252 and 254 are used to input and output information to and from system 200.

A display device 262 is operatively coupled to system bus 202 by display adapter 260.

Of course, the processing system 200 may also include other elements (not shown), as readily contemplated by one of skill in the art, as well as omit certain elements. For example, various other input devices and/or output devices can be included in processing system 200, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 200 are readily contemplated by one of ordinary skill in the art given the teachings of the present invention provided herein.

Figure 3:
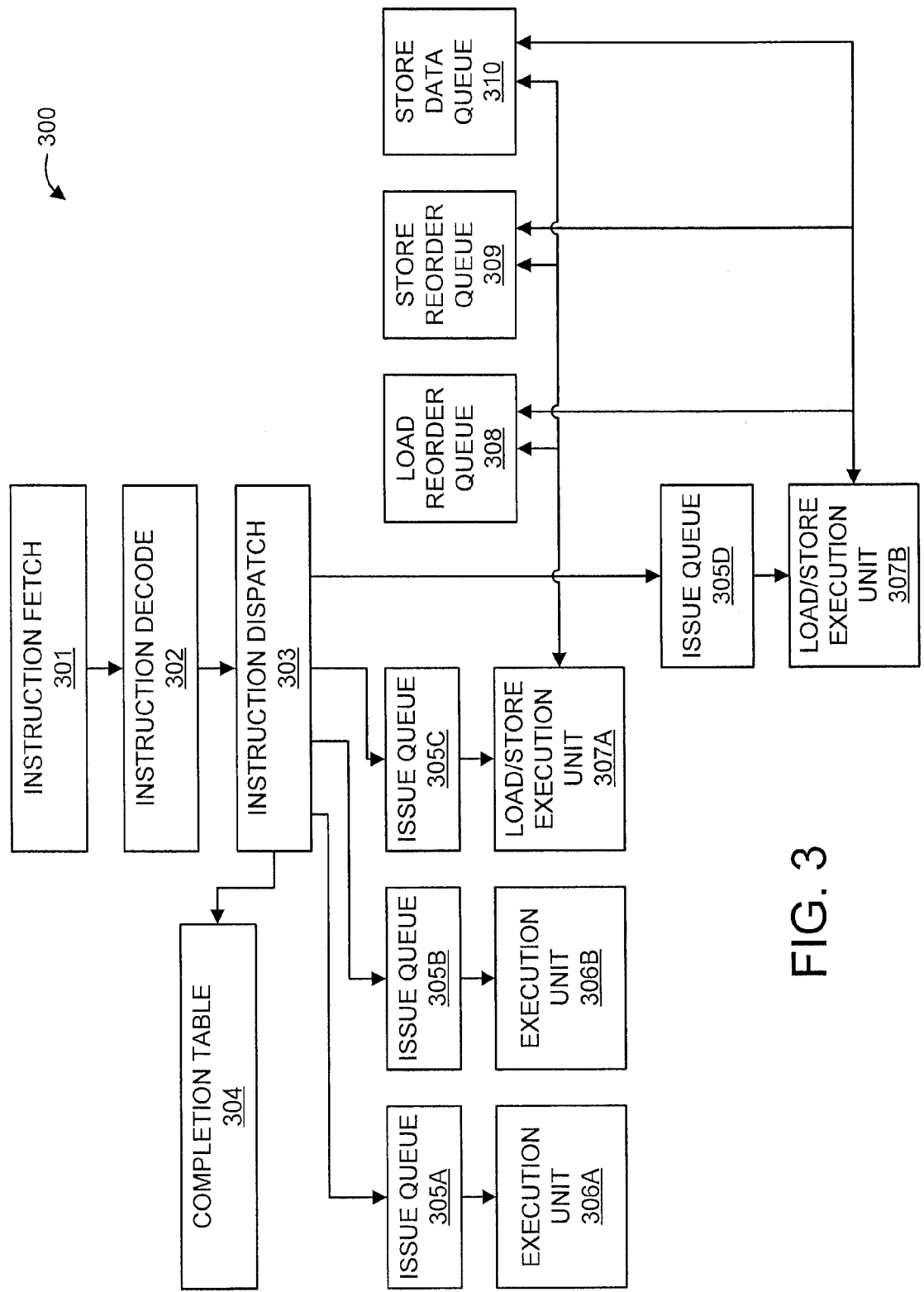
FIG. 3 is a block diagram showing an exemplary processor 300 to which the present principles can be applied, in accordance with an embodiment of the present principles.

Moreover, it is to be appreciated that processor 300 described below with respect to FIG. 3 is a processor for implementing respective embodiments of the present invention. Thus, in an embodiment, processor 300 may be used in computer processing system 200 as CPU 204.

Figure 5:
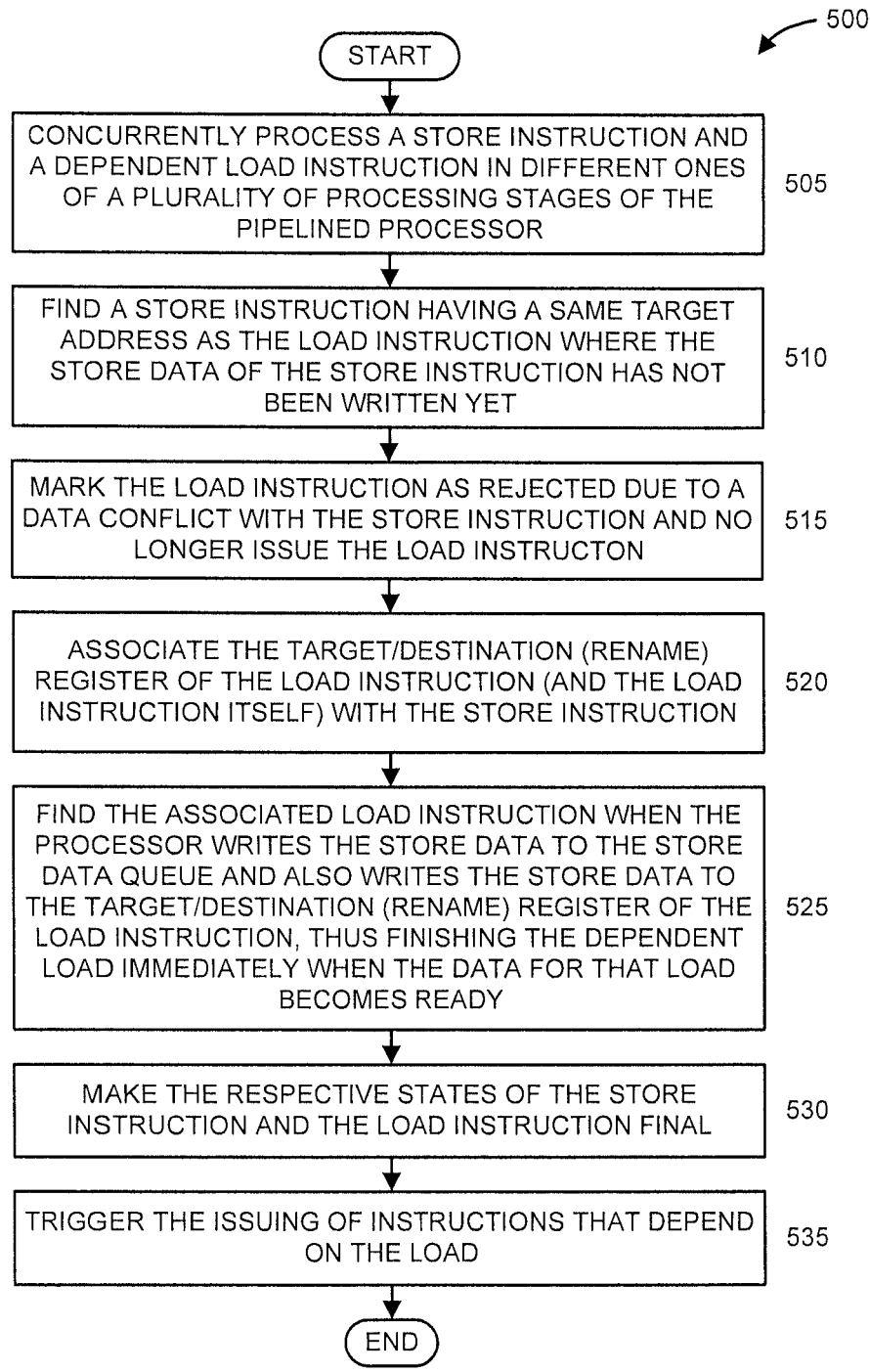
FIG. 5 is a flow diagram showing an exemplary method 500 for instruction execution that enables the simultaneous finish of a store instruction and a dependent load instruction in a pipelined processor having a plurality of processing stages, in accordance with an embodiment of the present principles.

Further, it is to be appreciated that processing system 200 and/or processor 300 may perform at least part of the method described herein including, for example, at least part of method 500 of FIG. 5.

FIG. 3 shows an exemplary processor 300 to which the present principles can be applied, in accordance with an embodiment of the present principles. The processor 300 includes an instruction fetch unit 301, an instruction decode unit 302, an instruction dispatch unit 303, a completion table 304, an array of issue queues 305A-D, an array of execution units 306A-B, an array of load/store units 307A-B, a load reorder queue 308, a store reorder queue 309, a store data queue 310. The operation of these elements will be described in further detail herein below.

Figure 4:
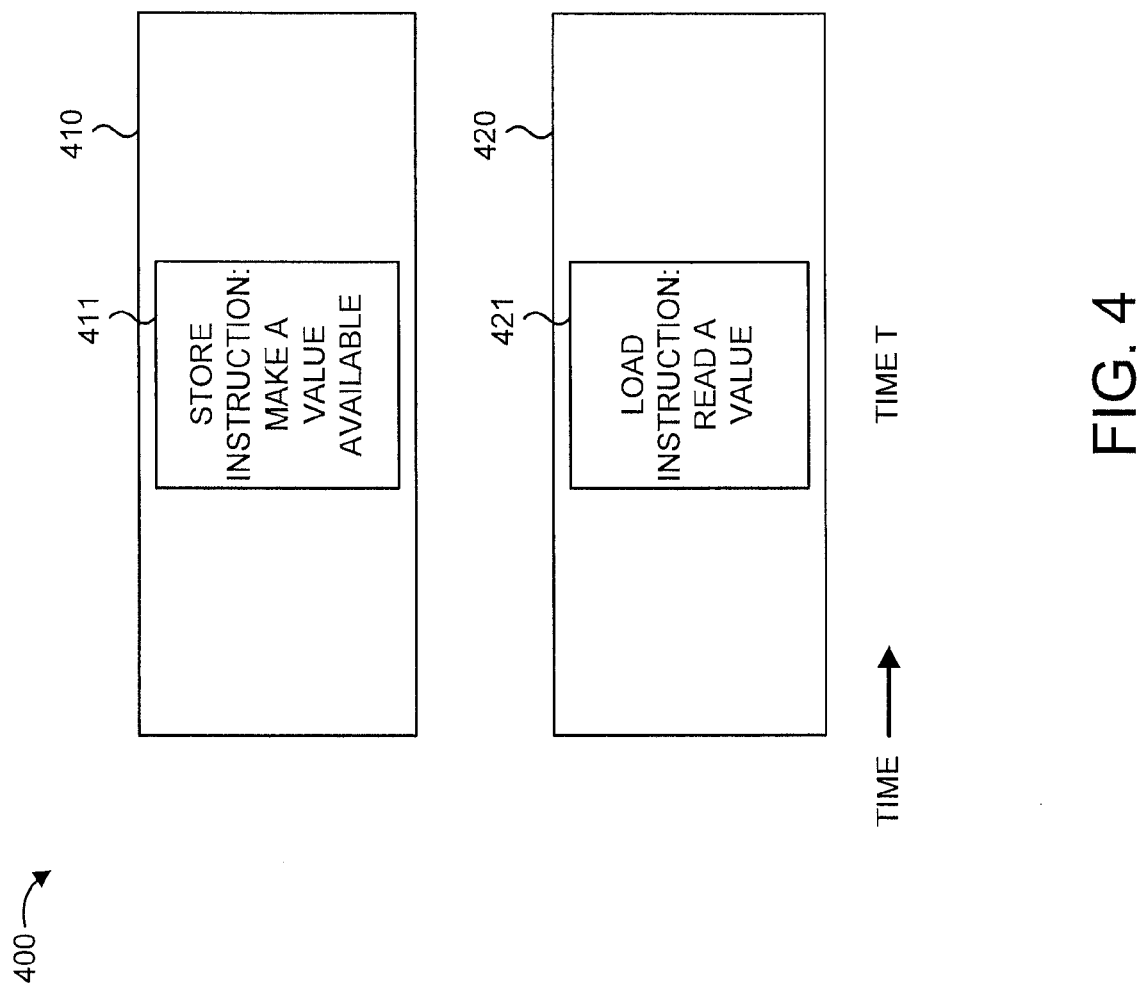
FIG. 4 is a timing diagram showing the best case scenario 400 for a load instruction 421 issued before a store instruction 411 that appears earlier than the load instruction 421 in program order, in accordance with an embodiment of the present principles.

FIG. 4 shows the best case scenario 400 for a load instruction 421 issued before a store instruction 411 that appears earlier than the load instruction 421 in program order, in accordance with an embodiment of the present principles. The load instruction 421 is processed in a load pipeline 420, and the store instruction 411 is processed in a store pipeline 410. In the best case scenario, the store instruction 411 in the store pipeline 410 completes at the same time T as the load instruction 411 in the load pipeline 421. An example of a program including such instructions is as follows, where the dots (".") represent other instructions:

Store val to mem1
Load from mem2

As mentioned above, FIG. 4 represents a best-based scenario 400, which rarely occurs. Rather, the scenario show in FIG. 1 is the common case scenario 100. However, the common case scenario 100 of FIG. 1 suffers from the aforementioned deficiencies including extra time penalties such as $T_{penalty}$ as shown in FIG. 1. Advantageously, the present principles remove this extra penalty $T_{penalty}$.

A description will now be given of an exemplary embodiment of the present principles.

In an embodiment, the pipeline stage of a store instruction performs additional operations. More concretely, in addition to writing a value to a store data queue entry, the following occurs, noting that the following referred to addresses relate to real addresses:

(1) the CPU marks a load that is exposing a target rename register as rejected when the load is rejected;

(2) the CPU no longer issues the marked load (eliminates the wasted instruction issue bandwidth and the useless usage of load pipelines);

(3) the CPU finds a marked load that has the same memory address as a store address, while the CPU processes a data store;

(4) the CPU writes the same value to the target register of the load and finishes the load (eliminates the penalty by finishing a dependent load immediately when the data becomes ready); and (5) the CPU triggers the issue of instructions that depend on the load (reduces the critical path length beginning with the load).

FIG. 5 shows an exemplary method 500 for instruction execution that enables the simultaneous finish of a store instruction and a dependent load instruction in a pipelined processor having a plurality of processing stages, in accordance with an embodiment of the present principles. In an embodiment, the processor is capable of performing out-of-order (OOO) execution and register renaming. For the sake of brevity, well-known operations will not be described with respect to FIG. 5. Rather, FIG. 5 will focus on the inventive details of the present principles.

At step 505, a store instruction and a dependent load instruction (hereinafter simply "load instruction") are being concurrently processed in different ones of the plurality of processing stages of the pipelined processor.

At step 510, the processor finds the store instruction having a same target address as the load instruction where the store data (the data to be stored) of the store instruction has not been written yet. For example, in an embodiment, when the CPU executes the load instruction in the load/store execution unit 307B, the CPU finds an entry for the store instruction in the store reorder queue 309 that has the same target address as the target address for the load instruction.

At step 515, the load instruction is marked as rejected due to the data conflict with the store instruction, and the load instruction is no longer issued. It is to be appreciated that step 515 can occur in some embodiments and not occur in others, depending upon the implementation.

At step 520, the processor associates the target/destination (rename) register of the load instruction (and the load instruction itself) with the store instruction (e.g., in the store reorder queue 309). For example, in an embodiment, the CPU saves the target register ID of the load instruction and the load instruction ID that identifies the load instruction in the completion table 304 to the entry of the store instruction in the store reorder queue 309.

At step 525, the processor finds the associated (dependent) load instruction when the processor writes the store data to the store data queue 310 and also writes the store data to the target/destination (rename) register of the load instruction, thus finishing the dependent load immediately when the data for that dependent load becomes ready. For example, in an embodiment, when the CPU (e.g., load/store execution unit 307B) writes a value to the entry corresponding to the store instruction in the store data queue 310, if the CPU finds the load instruction ID associated with the store instruction in the store reorder queue 309, the CPU (e.g., load/store execution unit 307B) also writes the value to the target register specified in the target register ID associated with the store instruction in the store reorder queue 309.

At step 530, the processor makes the respective states of the store instruction and the load instruction final (that is, ready for completion/retired), e.g., in the completion table 304.

At step 535, the processor triggers the issuing of instructions (from the issue queues 305) that depend on the load (to reduce the critical path length beginning with the load).

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

What is claimed is:

1. A method for reducing a pipeline stall in a multi-pipelined processor, the method comprising:
    finding a store instruction having a same target address as a load instruction and having a store value of the store instruction not yet written according to the store instruction, when the store instruction is being concurrently processed in a different pipeline than the load instruction and the store instruction occurs before the load instruction in a program order;
    detecting a potential conflict between the load instruction and the store instruction;
    marking the load instruction as rejected responsive to said detecting step;
    preventing a reissuing of the load instruction responsive to the load instruction being marked as rejected;
    associating a target rename register of the load instruction as well as the load instruction itself with the store instruction, responsive to the finding of the store instruction having the same target address as the load instruction and having the store value of the store instruction not yet written according to the store instruction; and
    writing the store value of the store instruction to the target rename register of the load instruction and finishing the load instruction without reissuing the load instruction, responsive to writing the store value of the store instruction according to the store instruction to finish the store instruction.

2. The method of claim 1, wherein said writing step comprises finding the associated load instruction responsive to writing the store value of the store instruction in a store reorder queue.

3. The method of claim 1, wherein the potential conflict comprises a potential load-store-hit with respect to the load instruction and the store instruction.

4. The method of claim 1, wherein the target address of the load instruction corresponds to the target rename register.

5. The method of claim 1, further comprising triggering an issuance of instructions that depend on the load instruction, responsive to the finishing of the load instruction.

6. The method of claim 1, wherein said finding step comprises comparing the target address of the load instruction to the target address of the store instruction.

7. The method of claim 1, wherein the method is initiated responsive to a determination of a possible read-after-write condition with respect to the store instruction and the load instruction dependent thereon.

8. The method of claim 1, wherein the method is performed by a processor implementing out-of-order execution such that the load instruction is reordered for execution before the store instruction.

9. The method of claim 1, wherein the method is processed by a processor implementing register renaming.

10. A processor for reducing a pipeline stall caused by a store instruction and a load instruction that is dependent upon the store instruction, comprising:
    one or more storage elements;
    a first pipeline for processing the load instruction;
    a second pipeline for processing the store instruction;
    circuitry for finding a store instruction having a same target address as a load instruction and having a store value of the store instruction not yet written according to the store instruction, when the store instruction is being concurrently processed in a different pipeline than the load instruction and the store instruction occurs before the load instruction in a program order;

circuitry for detecting a potential conflict between the load instruction and the store instruction;

circuitry for marking the load instruction as rejected responsive to said detecting step;

circuitry for preventing a reissuing of the load instruction responsive to the load instruction being marked as rejected;

circuitry for associating a target rename register of the load instruction as well as the load instruction itself with the store instruction, responsive to the finding of the store instruction having the same target address as the load instruction and having the store value of the store instruction not yet written according to the store instruction; and circuitry for writing the store value of the store instruction to the target rename register of the load instruction and finishing the load instruction without reissuing the load instruction, responsive to writing the store value of the store instruction according to the store instruction to finish the store instruction.

11. The processor of claim 10, further comprising circuitry for finding the associated load instruction responsive to writing the store value of the store instruction in a store reorder queue.

12. The processor of claim 10, wherein the potential conflict comprises a potential load-store hit with respect to the load instruction and the store instruction.

13. The processor of claim 10, wherein the target address of the load instruction corresponds to the target rename register.

14. The processor of claim 10, further comprising circuitry for triggering an issuance of instructions that depend on the load instruction, responsive to the finishing of the load instruction.

15. The processor of claim 10, wherein said circuitry for finding comprises circuitry for comparing the target address of the load instruction to the target address of the store instruction.

16. The processor of claim 10, wherein said circuitry for finding is initiated responsive to a determination of a possible read-after-write condition with respect to the store instruction and the load instruction dependent thereupon.

17. The processor of claim 10, wherein the processor is a multi-pipelined processor implementing out-of-order execution such that the load instruction is reordered for execution before the store instruction.

18. The processor of claim 10, wherein processor is a multi-pipelined processor implementing register renaming.

* * * * *